United States Patent
Yoon et al.

(10) Patent No.: US 8,239,616 B2
(45) Date of Patent: Aug. 7, 2012

(54) SEMICONDUCTOR DEVICE COMPRISING FLASH MEMORY AND ADDRESS MAPPING METHOD

(75) Inventors: Han-bin Yoon, Hwaseong-si (KR); Young-goo Ko, Anyang-si (KR); Jung-been Im, Hwaseong-si (KR); Hwan-jin Yong, Seoul (KR); Chang-Hee Lee, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 310 days.

(21) Appl. No.: 12/629,268

(22) Filed: Dec. 2, 2009

(65) Prior Publication Data

US 2010/0138595 A1    Jun. 3, 2010

(30) Foreign Application Priority Data

Dec. 3, 2008  (KR) ........................ 10-2008-0122041

(51) Int. Cl.
*G06F 12/00* (2006.01)
(52) U.S. Cl. ......... 711/103; 711/162; 711/170; 711/202
(58) Field of Classification Search .................. None
See application file for complete search history.

(56) References Cited

U.S. PATENT DOCUMENTS

2006/0282644 A1    12/2006  Wong
2010/0005270 A1*   1/2010   Jiang ............................ 711/206

FOREIGN PATENT DOCUMENTS

KR    100771521 B1   10/2007
KR    100806343 B1   2/2008

* cited by examiner

*Primary Examiner* — Shawn X Gu
(74) *Attorney, Agent, or Firm* — Volentine & Whitt, PLLC

(57) ABSTRACT

A semiconductor device with flash memory includes; a log type determining unit configured to select log type from among a plurality of log types with respect to a log block storing program data requested to be programmed in the flash memory and generate a control signal indicating information indicating the selected log type, and a plurality of log units configured to store program data in the log block having a corresponding log type in response to the control signal, wherein the log type determining unit converts a first type log block formed by a first log type and included in a first type log unit from among the plurality of log units into second type log block formed by a second log type and converts the log block included in a second type log unit from among the plurality of log units into the first type log blocks, the first log type being different from the second log type.

5 Claims, 7 Drawing Sheets

FIG. 4A

| GMT | | LPM | | LMT | |
|---|---|---|---|---|---|
| | | 0x0 | 0xA | 0x137 | 0x015 |
| | | 0x1 | 0xB | 0x138 | 0x034 |
| | | 0x2 | 0xC | 0x139 | 0x004 |
| | | 0x3 | 0xD | 0x13A | 0x073 |
| | | 0x4 | 0xE | 0x13B | 0x0A5 |
| | | 0x5 | 0xF | 0x13C | 0x02E |

| GMT | | LPM | | LMT | |
|---|---|---|---|---|---|
| 0x138A | 0x0340 | 0x0 | | 0x137 | 0x015 |
| 0x138B | 0x0341 | 0x1 | | 0x138 | 0x034 |
| 0x138C | 0x0342 | 0x2 | | 0x139 | 0x004 |
| 0x138D | 0x0343 | 0x3 | | 0x13A | 0x073 |
| 0x138E | 0x0344 | 0x4 | | 0x13B | 0x0A5 |
| 0x138F | 0x0345 | 0x5 | | 0x13C | 0x02E |

SEMICONDUCTOR DEVICE COMPRISING FLASH MEMORY AND ADDRESS MAPPING METHOD

CROSS-REFERENCE TO RELATED APPLICATION

This application claims the benefit of Korean Patent Application No. 10-2008-0122041 filed on Dec. 3, 2008, the subject matter of which is hereby incorporated by reference.

BACKGROUND

The inventive concept relates to semiconductor devices, and more particularly to semiconductor devices including a flash memory which may efficiently allocate memory space according to different types of log blocks and address mapping methods for such a semiconductor device.

In flash memory, erase operations are performed before program operations. However, programming and read operations in flash memories are performed in page units, whereas erase operations are performed in block units. Accordingly, in flash memory programming operations, a flash translation layer (FTL) is used, where the FTL maps logic addresses to be programmed into corresponding physical addresses at which an erase operation is performed.

Many FTL algorithms essentially include a log block mapping method. In the log block mapping method, a limited number of log blocks are used as write buffers.

SUMMARY

The inventive concept provides a semiconductor device including a flash memory which may efficiently allocate memory space according to different types of log blocks, and an address mapping method of the semiconductor device.

According to an aspect of the inventive concept, there is provided a semiconductor device including a flash memory, the semiconductor device including: a log type determining unit configured to select log type from among a plurality of log types with respect to a log block storing program data requested to be programmed in the flash memory and generate a control signal indicating information about the selected log type, and a plurality of log units configured to store the program data in the log block which has the corresponding log types in response to the control signal, wherein the log type determining unit converts a first type log block formed by a first log type and included in a first type log unit from among the plurality of log units into second type log block formed by a second log type and converts the log block included in a second type log unit from among the plurality of log units into the first type log blocks, the first log type being different from the second log type.

The semiconductor device may further include a mapping table configured to store mapping information between the log blocks included in each of the plurality of log units and logic addresses of program data stored in the log blocks, wherein the log type determining unit converts the first type log block into the second type log block by correcting the mapping information about the first type log unit to the mapping information about the second type log unit or converts the second type log block into the first type log block by correcting the mapping information about the second type log unit to the mapping information about the first type log unit.

The first type log block may be formed randomly to logic addresses, in which the program data is to be programmed, and the second type log block may be formed sequentially to logic addresses, in which the program data is to be programmed.

When the logic addresses for the program data correspond to and are sequential to the logic addresses of pages stored in the second type log block, the log type determining unit may select the second log type.

The second type log unit may store the program data in the second type log block in response to the control signal.

When the logic addresses for the program data correspond to but are not sequential to the logic addresses of pages stored in the second type log block, the log type determining unit may convert the second type log block into the first type log block, if the number of pages which may be stored in the second type log blocks is greater than a predetermined number.

The first type log unit may store the program data in the first type log block in response to the control signal.

When the number of pages which may be stored in the second type log block is less than a predetermined number, the second type log blocks may be transmitted to a data block.

When the logic addresses for the program data do not correspond to logic addresses of the pages stored in the second type log block, the log type determining unit may select the first log type or selects the second log type according to the size of the program data.

When the size of the program data is greater than a predetermined size, the second type may be selected, and when the size of the program data is less than the predetermined size, the first type may be selected and the control signal is generated.

BRIEF DESCRIPTION OF THE DRAWINGS

Embodiments of the inventive concept will be more clearly understood from the following detailed description taken in conjunction with the accompanying drawings in which:

FIGS. 4A and 4B conceptually illustrate an operation of converting one type of log block into another type of log block in the semiconductor device of FIG. 1 according to an embodiment of the inventive concept.

DETAILED DESCRIPTION OF THE EMBODIMENTS

Embodiments of the inventive concept will now be described with reference to the accompanying drawings. However, the inventive concept may be variously embodied and should not be construed as being limited to only the illustrate examples. Throughout the drawings and written description, like reference numbers and labels are used to denote like or similar elements.

Figure 1:
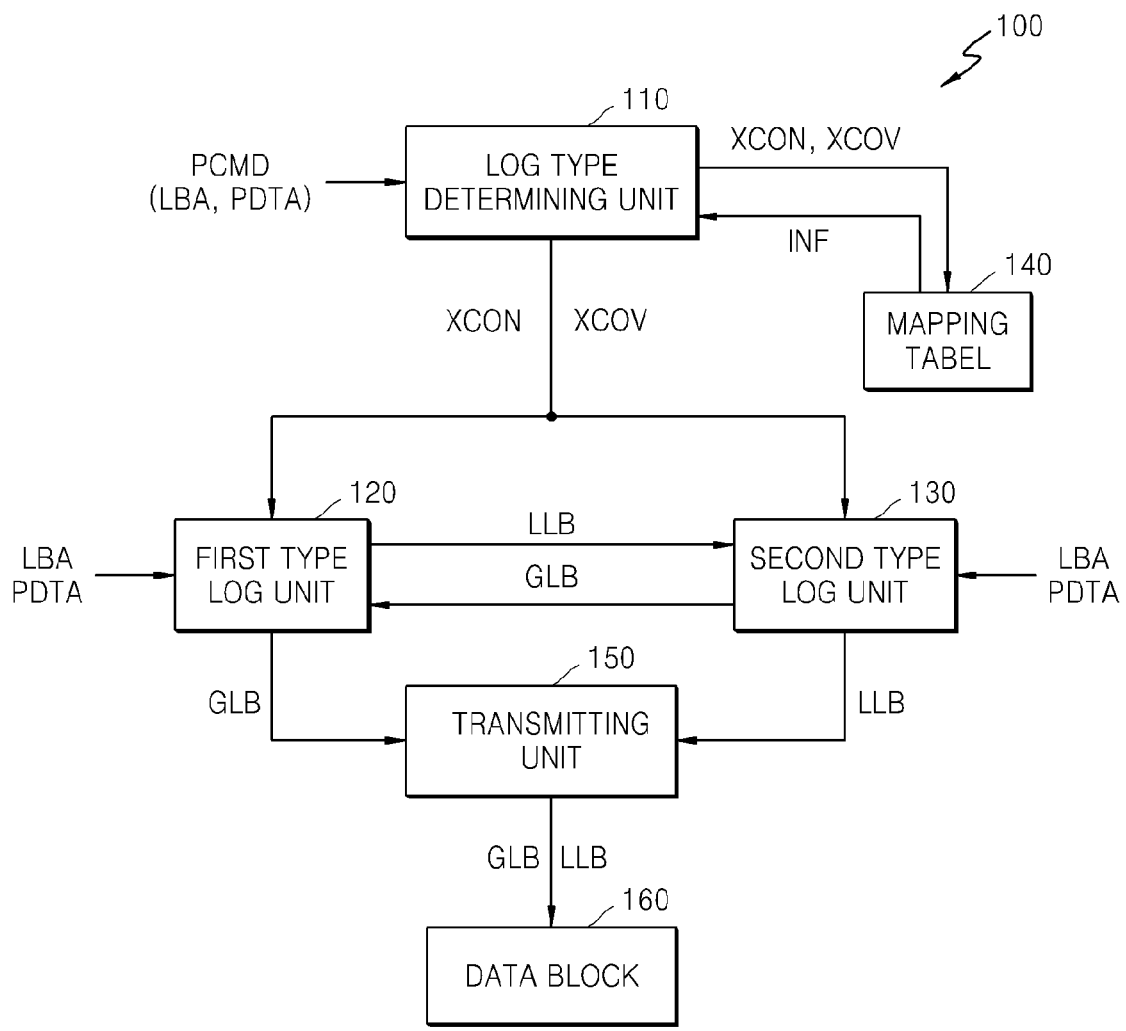
FIG. 1 is a partial block diagram of a semiconductor device according to an embodiment of the inventive concept.

FIG. 1 is a partial block diagram of a semiconductor device 100 according to an embodiment of the inventive concept. Referring to FIG. 1, the semiconductor device 100 comprise a log type determining unit 110, a first type log unit 120, a second type log unit 130, and a data block 160.

The log type determining unit 110 may be included in a memory controller of the semiconductor device 100 of FIG. 1. The first type log unit 120, second type log unit 130, and the data block 160 may be included in a flash memory of the semiconductor device 100 of FIG. 1. The memory controller and the flash memory is illustrated as MC and FM in FIG. 6 respectively. The inventive concept is not limited thereto and the first type log unit 120 and second type log unit 130 may be included in the memory controller. Also, the log type determining unit 110 may be implemented into software embedded in the semiconductor device 100 or may be implemented by a logic circuit.

The log type determining unit 110 may determine the type of log blocks which may buffer program data PDTA that is to be programmed in a flash memory, in response to a program command PCMD received in the semiconductor device 100. The semiconductor device 100 may select the type of log blocks in which the program data PDTA is to be stored from two different types of log blocks such as a first type and a second type. However, the inventive concept is not limited thereto and one of three or more types of log schemes may be selected.

The first type of log scheme may form log blocks with respect to random logic addresses LBA for the program data PDTA that is to be programmed and the second type of log scheme may form log blocks with respect to sequential logic addresses LBA.

The log type determining unit 110 may select the log type based on various factors. An operating algorithm of the log type determining unit 110 will be described later. The log type determining unit 110 may generate a control signal XCON indicating information about the selected type.

When the control signal XCON indicates that the first type is selected, the first type log unit 120 receives the logic addresses LBA and the program data PDTA and writes the received logic addresses LBA and program data PDTA to first type log blocks GLB. Similarly, when the control signal XCON indicates that the second type is selected, the second type log unit 130 receives the logic addresses LBA and the program data PDTA and writes the received logic addresses LBA and program data PDTA to second type log blocks LLB.

Figure 2A:
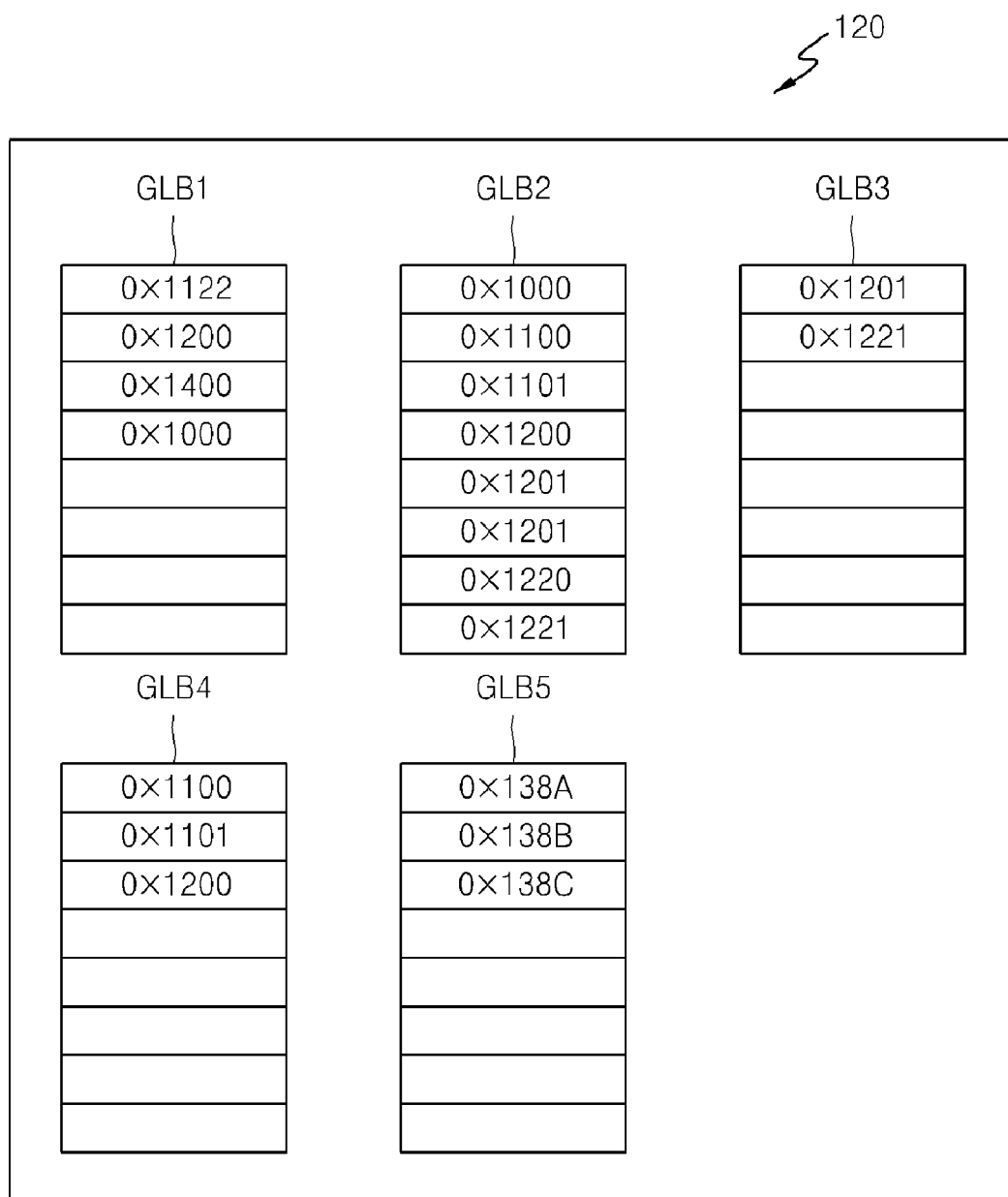
FIGS. 2A and 2B conceptually illustrate log blocks formed in a first type log unit and a second type log unit of FIG. 1.
Figure 2B:
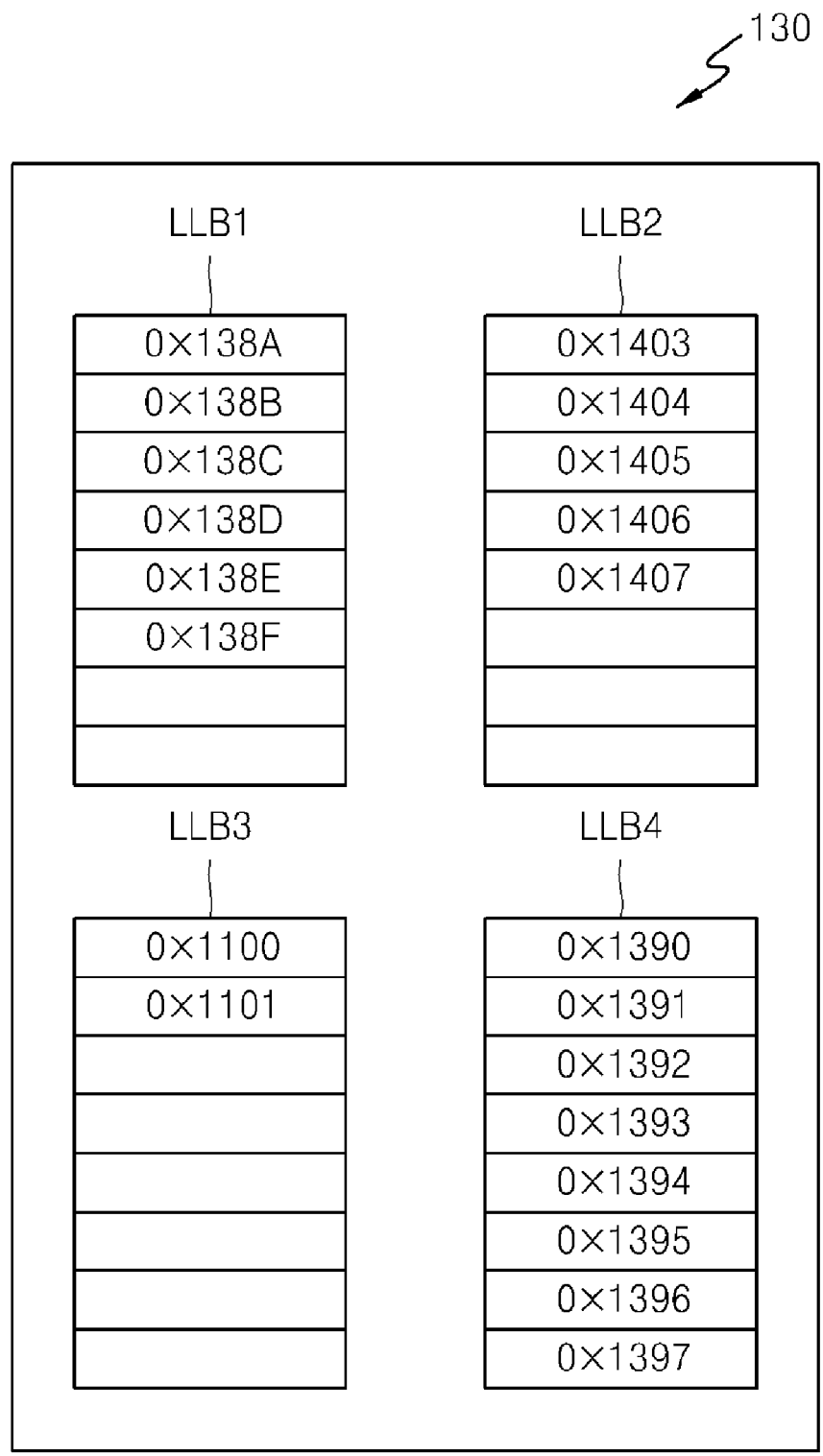

Examples of the log blocks GLB and LLB formed in the first type log unit 120 and the second type log unit 130 are respectively illustrated in FIGS. 2A and 2B according to embodiments of the inventive concept.

Referring to FIG. 2A, the log blocks GLB1 through GLB5 formed in the first type log unit 120 store pages having random logic addresses LBA. However, as in the log block GLB5, pages having sequential logic addresses may be randomly stored. Referring to FIG. 2B, the log blocks LLB1 through LLB4 formed in the second type log unit 130 store pages having sequential logic addresses LBA.

However, when memory space that are allocated to each log type are limited and when write requests by a specific log type are significantly greater than those by the other log type, an erase operation for securing memory space with respect to the specific log type may be performed, regardless of sufficient memory space for the other log type.

In this case, a time delay may occur in the erase operation, and thus the overall operating speed of the semiconductor device 100 may be reduced.

Figure 3:
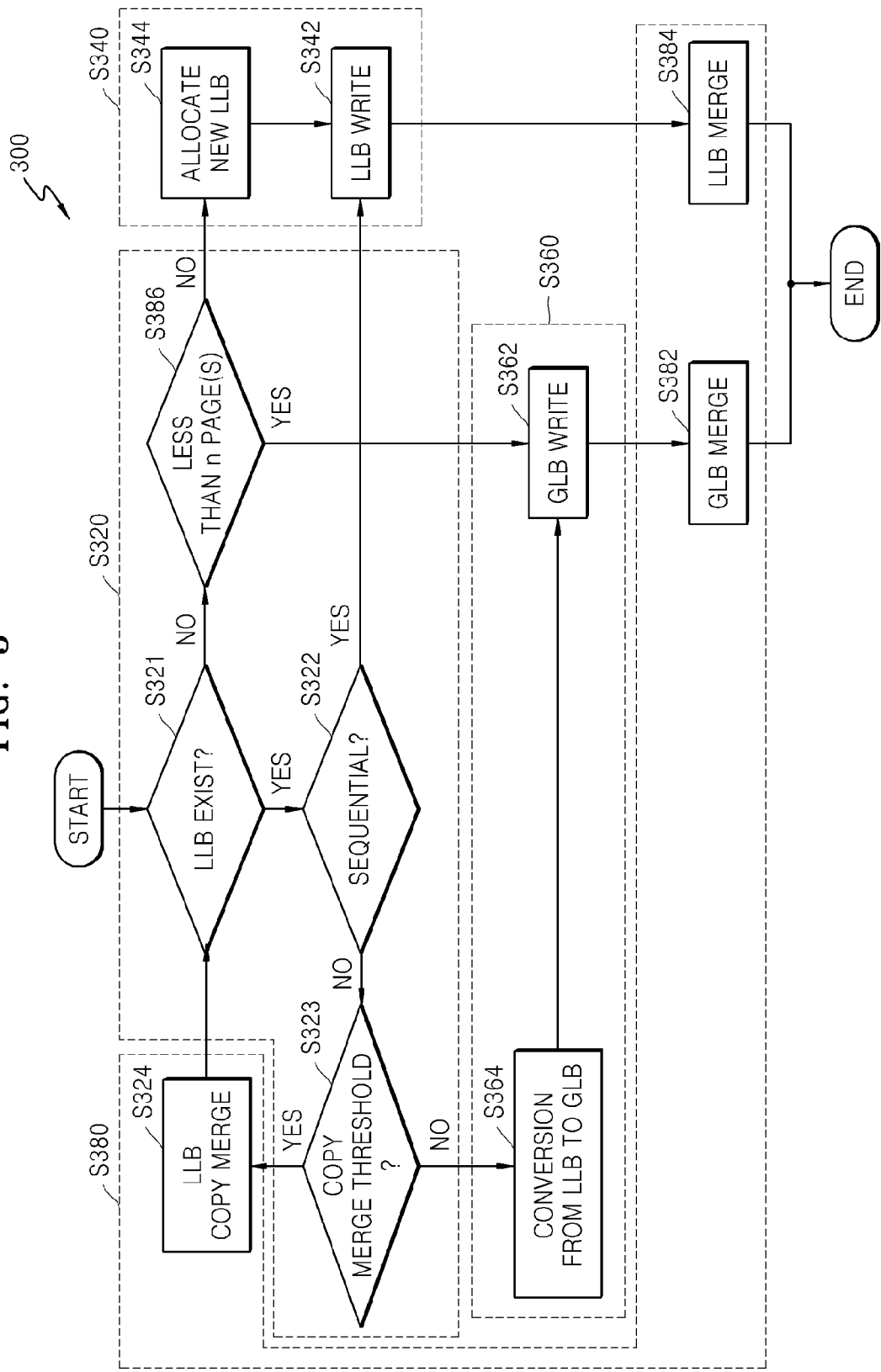
FIG. 3 is a flowchart summarizing a mapping method for the semiconductor device of FIG. 1 according to an embodiment of the inventive concept.

In order to overcome such inefficiency, the semiconductor device 100 of FIG. 1 adopts a mapping method 300 as illustrated in FIG. 3, according to an embodiment of the inventive concept.

Referring to FIGS. 1 and 3, the log type determining unit 110 first determines the log type with respect to mapping to the log block of the page to which programming is requested by receiving a request for programming in a flash memory included in the semiconductor device 100 of FIG. 1, and outputs the corresponding control signal XCON (S320).

Accordingly, the log type determining unit 110 determines whether the logic addresses LBA of the pages, to which programming is requested, correspond to the logic addresses LBS of the pages stored in the second type log blocks LLB (S321). For example, when a programming request for the logic address "0x1409" is received, it may be determined whether a log block, to which the page for "0x1409" is to be written, exists in the second type log unit 130.

Referring to FIG. 2B, the second type log block LLB2 which stores the pages for "0x1403" through "0x1407" exists. The log block LLB2 is the second type log block that stores sequential logic addresses LBA and thus there is a possibility to write "0x1409" in the log block LLB2.

In this case of S321=YES, it is determined whether the requested logic address LBA is sequential to the logic addresses LBA of the pages stored in the corresponding log block (S322). For example, when the requested logic address LBA is "0x1408", the requested logic address LBA "0x1408" is sequential to "0x1407" of the log block LLB2 ("YES" in operation S322) and thus the page for the requested logic address LBA may be stored in the second type log block LLB2 (S342).

However, when the requested logic address LBA is "0x1409", the requested logic address LBA "0x1409" is not sequential to the 0x1407" of the log block LLB2 (S322=NO) and thus the following operation is performed.

The determinations in the foregoing operations (S321 and S322) may be performed by the log type determining unit 110 with reference to mapping information INF received from a mapping table 140 with respect to the pages included in the log block. The mapping table 140 may store mapping information INF in which the logic addresses LBA of the pages stored in the log blocks of the first type log unit 120 and the second type log unit 130 are mapped to physical addresses of the log blocks of the first type log unit 120 and the second type log unit 130. The mapping table 140 may be realized as a volatile memory. The mapping table 140 will be described in more detail later.

Referring to FIGS. 1 and 3, in the mapping method 300 of FIG. 3, when the log block corresponding to the requested logic address LBA exists as "LLB" (S321=YES), but the requested logic address LBA is not sequential to the logic addresses included in the corresponding log block (S322=NO), it is determined whether the size of the storage space of the corresponding log block is less than a threshold value (S323).

When the size of the memory space of the corresponding log block is less than the threshold value (S323=YES), the corresponding log block is copied to the data block 160 (S386). When the threshold value is (e.g.) 3 (i.e., when the number of pages which may be stored in the corresponding log block is 3), the log block LLB2 in which the requested logic address LBA corresponds to "0x1409" is copied to the data block 160. This operation (S386) will be described in more detail later.

New data may be overwritten in the log blocks of the first type log unit 120 or the second type log unit 130 that is copied and merged with the data block 160.

In this case, since a write operation for "0x1409" is not yet performed to the log block, it is determined whether the log block corresponding to the requested logic address "0x1409" exists as "LLB" (S321). The log block LLB which corresponds to the logic address "0x1409" is copied and merged with the data block 160, in operation 386, and thus, does not exist as "LLB". Other LLBs, to which "0x1409" is to be written, do not exist in FIG. 2B (S321=NO) and thus operation S386 is performed.

In operation S386, it may be determined whether the size of data currently requested to be programmed (number of pages) is less than N, where N is a natural number, and "N" may be determined based on the specification of a system. When the size of the program data PDTA is greater than N pages (S386=NO), the log type for the requested logic address LBA may be selected as the second type. If the size of the program data PDTA is greater than N pages, the logic addresses of the program data PDTA are sequential and thus it is efficient to store the pages in the second type log unit 130.

When the log type of the logic address LBA requested by the log type determining unit 110 is determined as the second type, the corresponding control signal XCON is transmitted to the second type log unit 130. The second type log unit 130 writes the page for the requested logic address LBA to the log block (S340).

Referring to FIGS. 1 and 3, when the log type determining unit 110 determines mapping to the log block of the page for the requested logic address LBA as the second type according to the operations above (S386=NO and S322=YES), the log type determining unit 110 transmits the corresponding control signal XCON to the second type log unit 130. The second type log unit 130 writes the page for the requested logic address LBA as the second type to the log block (S340).

In this regard, when the memory space in the log block of the second type log unit 130 exists for the requested logic address LBA (S322=YES), that is, when the second type log blocks, in which the pages for the logic addresses that are sequential to the requested logic address are stored, exist, the page is written to the corresponding log block (S342).

When the "LLB" for the requested logic address LBA does not exist (S321=NO), but the size of the data requested to be programmed is greater than N pages ("NO" in operation S386), the second type log unit 130 allocates new second type log blocks, in operation S344, and may store pages in the newly allocated log blocks, in operation S342.

Referring to FIGS. 1 and 3, when the "LLB" for the requested logic address (LBA) does not exist (S321=NO) and the size of the data requested to be programmed is less than N pages (S386=YES), the log type determining unit 110 selects the log type for the requested logic address LBA as the first type.

In addition, when the "LLB" does not exist (S321=NO), but the requested logic address LBA is not sequential to the logic addresses included in the corresponding log block (S322=NO) and the size of the memory space of the corresponding log block is greater than the threshold value (S323=NO), the log type determining unit 110 selects the log type for the requested logic address LBA as the first type.

When the log type determining unit 110 determines mapping to the log block of the page for the requested logic address LBA as the first type according to the operations above (S386=YES and S323=NO), the log type determining unit 110 transmits the corresponding control signal XCON to the first type log unit 120.

The first type log unit 120 writes the page for the requested logic address LBA as the first type to the log block, in operation 360. When the "LLB" for the requested logic address LBA does not exist (S321=YES) and the size of the data requested to be programmed is less than N pages (S386=YES), the corresponding page is written in the "GLB". On the other hand, when the "LLB" does not exist (S321=NO), but the requested logic address LBA is not sequential to the logic addresses included in the corresponding log block (S322=NO) and the size of the memory space of the corresponding log block is greater than the threshold value (S323=NO), the corresponding log block is converted from the "LLB" to the "GLB", in operation S364, and the page may be stored in the converted "GLB", in operation S362.

Here, the second type log blocks may be converted into the first type log blocks or the first type log blocks may be converted into the second type log blocks by changing pointer values with respect to the corresponding log blocks in the mapping table 140 in response to a conversion signal XCOV of the log type determining unit 110. This will be described below in more detail.

Referring to FIGS. 2A and 2B and FIG. 4A, the mapping table 140 may include a first type mapping table GMT, a second type mapping table LMT, and a sub mapping table LPM with respect to the second type mapping table LMT.

The first type mapping table GMT for the first type log unit 120 includes information about log blocks included in the first type log unit 120. Similarly, the second type mapping table LMT for the second type log unit 130 includes information about the log blocks included in the second type log unit 130.

For example, when it is assumed that a physical address of the log block LLB1 included in the second type log unit 130 starts with "0x0340", the logic addresses "0x138" of the pages that are commonly used and stored in the log block LLB1 are mapped to "0x034" in the second type mapping table LMT. Then, addresses "A", "B", "C", "D", "E", and "F" that are suffixes of the common part of the address "0x138" in the logic addresses of the pages stored in the log block LLB1 are mapped to "0", "1", "2", "3", "4", and "5" in the sub mapping table LPM of the second type mapping table LMT.

That is, the logic addresses "0x138A" through "0x138F" of the pages stored in the log block LLB1 included in the second type log unit 130 are respectively mapped to "0x0340" through "0x0345" in the second type mapping table LMT and its sub mapping table LPM.

Moreover, the first type mapping table GMT in FIG. 4A does not include page mapping information about the second type log blocks LLB1.

In FIGS. 4A and 4B, two mapping tables are shown with respect to the second type log unit 130, that is, the second type mapping table LMT and its sub mapping table LPM. However, the inventive concept is not limited thereto and only one mapping table such as the first type mapping table GMT, which will be described later, may be included with respect to the second type log unit 130.

Referring back to FIG. 1 and FIGS. 4A and 4B, when the second type log blocks LLB are to be converted into the first type log blocks GLB as in operation S364 in FIG. 3, the log type determining unit 110 generates the conversion signal XCOV. In response to the conversion signal XCOV, the pointer values with respect to the corresponding log blocks in the mapping table 140 may be changed as in FIG. 4B.

Referring to FIG. 4B, the second type mapping table LMT with respect to the log block LLB1 and its sub mapping table LPM are deleted. Then, the mapping information for the log block LLB1 is stored in the first type mapping table GMT. Accordingly, the log type of the log block LLB1 is converted into the first type.

As described above, in the semiconductor device 100 and the mapping method 300 in a flash memory included in the semiconductor device 100 according to embodiments of the inventive concept, only mapping information of the first type mapping table GMT and the second type mapping table LMT are changed and thus the "LLB" may be converted into the "GLB" (S364 in FIG. 3).

Accordingly, as log blocks of different log types may be converted, the different log type memory space may be efficiently allocated in the semiconductor device 100 and using the mapping method 300 in a flash memory included in the semiconductor device 100, according to embodiments of the inventive concept.

Referring to FIGS. 1 and 3, when allocation of the log blocks with respect to the requested logic address LBA is completed in operation S342 or S362, a transmitting unit 150 transmits the log blocks LLB and GLB to the data block 160 (S380). That is, when storing of the data to be programmed in the first type log block GLB is completed in operation S362, the transmitting unit 150 may transmit the first type log block GLB to the data block 160 in operation S382 or when storing of the data to be programmed in the second type log blocks LLB is completed, in operation S342, the transmitting unit 150 may transmit the second type log blocks LLB to the data block 160 (S384).

In addition, as described above, the second type log blocks LLB may be transmitted to the data block 160 according to (S386).

Figure 5:
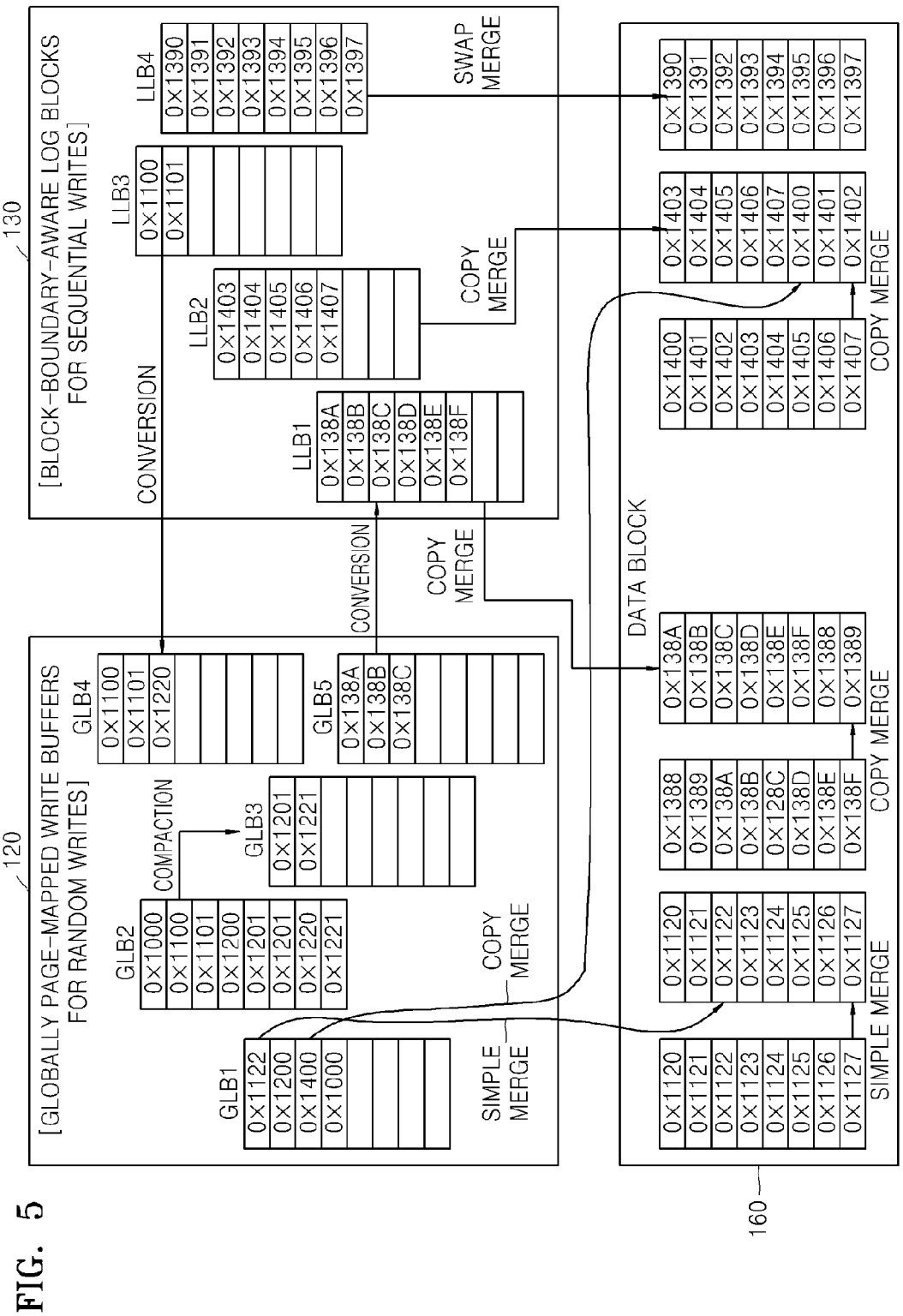
FIG. 5 conceptually illustrates a merge operation and a log block convert operation in the semiconductor device of FIG. 1 according to an embodiment of the inventive concept.

As illustrated in FIG. 5, the transmitting unit 150 may transmit the log blocks LLB and GLB to the data block 160 by copy merge, simple merge, or swap merge the log blocks LLB and GLB with each other.

In FIG. 5, compaction operations and log type conversion in the first type log unit 120 and the second type log unit 130 are shown.

The copy merge, simple merge, and swap merge operations are well known to those of ordinary skill in the art to which the inventive concept pertains and thus detailed descriptions thereof are not provided here.

Figure 6:
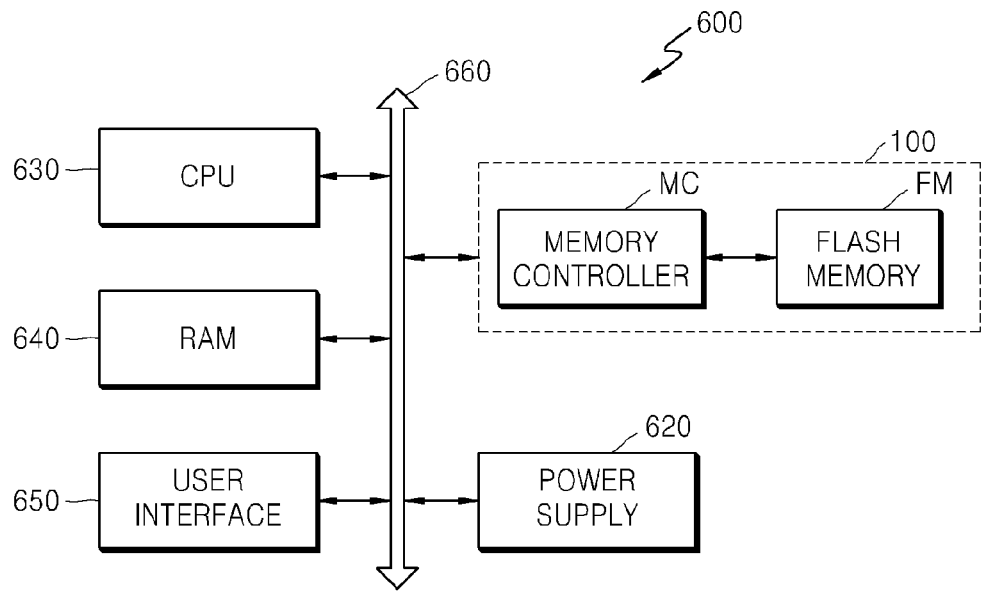
FIG. 6 is a block diagram of a computing system apparatus including the semiconductor device of FIG. 1, according to an embodiment of the inventive concept.

FIG. 6 is a block diagram of a computing system apparatus 600 including the semiconductor device 100 of FIG. 1, according to an embodiment of the inventive concept.

The computing system apparatus 600 includes a microprocessor 630, a user interface 650, the semiconductor device 100 having a memory controller MC and a flash memory FM, which are electrically connected to a bus 660. N-bit data (N is an integer equal to or greater than 1) that is processed or is to be processed by the microprocessor 630, may be stored in the flash memory FM. The computing system apparatus 600 may further include a random access memory (RAM) 640 and a power supply 620.

When the computing system apparatus 600 is a mobile apparatus, a battery for providing an operating voltage of the computing system apparatus 600 and a modem such as a baseband chipset may be further provided. It would have been obvious to one of ordinary skill in the art that the computing system apparatus 600 may further include an application chipset, a camera image processor (CIS), a mobile dynamic random access memory (DRAM), etc., and thus a detailed description thereof will be omitted.

For example, the semiconductor device 100 may be configured as a solid state driver/disk (SSD) using a nonvolatile memory for storing data.

Figure 7:
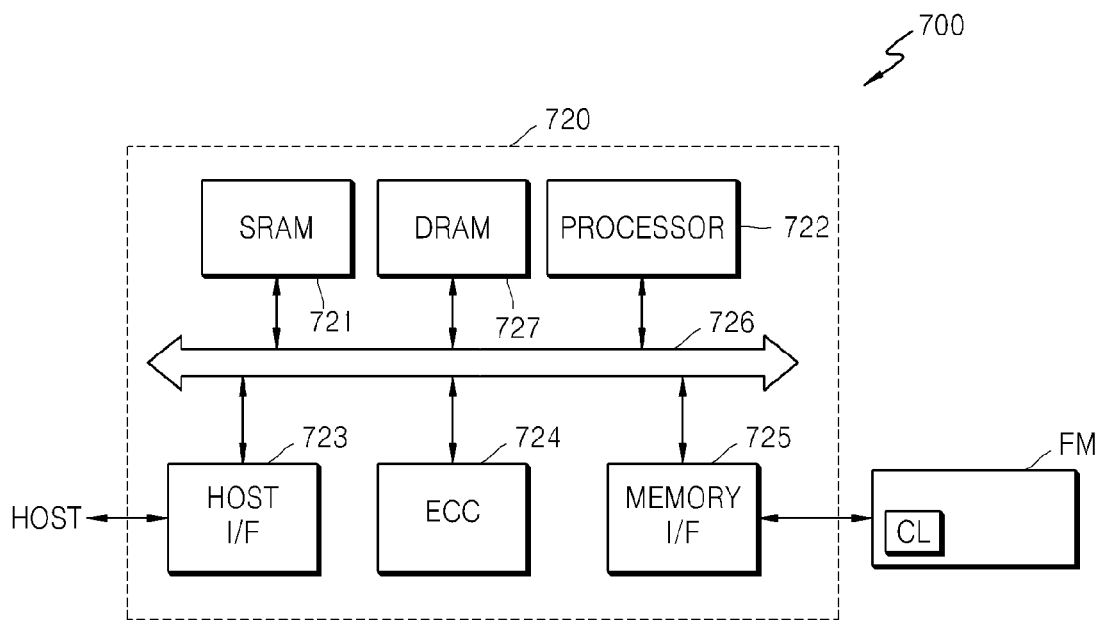
FIG. 7 is a block diagram of a memory card including the semiconductor device of FIG. 1, according to an embodiment of the inventive concept.

FIG. 7 is a block diagram of a memory card 700 including the semiconductor device of FIG. 1, according to an embodiment of the inventive concept. As illustrated in FIG. 7, the memory card 700 includes a controller 720 and the flash memory FM. In this case, the controller 720 may communicate with an external element (e.g., a host apparatus) through one of various interface protocols such as USB, MMC, PCI-E, SATA, PATA, SCSI, ESDI, and IDE.

In FIG. 7, the structures and operations of a Processor 722, an SRAM 721, a HOST I/F 723, an ECC 724, a MEMORY I/F 725, a bus 726 and a DRAM 727 would have been obvious to one of ordinary skill in the art, and thus a detailed description thereof will be omitted. The Processor 722 may include the log type determining unit 110 of FIG. 1 and the SRAM 721 may include the log units 120, 130 of FIG. 1. The inventive concept is not limited thereto and a control logic CL of the flash memory FM may include the log type determining unit 110 and the log units 120, 130 of FIG. 1. The mapping table 140 of FIG. 1 may be stored in the DRAM 727 of the controller 720 and updated frequently. The mapping table 140 stored in the DRAM 727 may be updated to the flash memory FM, periodically.

The semiconductor device 100 may be embedded using various packages, for example, package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flatpack (TQFP), small outline (SOIL), shrink small outline package (SSOP), thin small outline (TSOP), thin quad flatpack (TQFP), system in package (SIP), multi chip package (MCP), wafer-level fabricated package (WFP), and wafer-level processed stack package (WSP).

While the inventive concept has been particularly shown and described with reference to exemplary embodiments thereof, it will be understood that various changes in form and details may be made therein without departing from the scope of the following claims.

What is claimed is:

1. An address mapping method of a flash memory comprising:
   determining a log type with respect to mapping addresses of program data requested to be programmed in the flash memory to a log block,
   wherein the determining the log type converts a first type log block formed by a first log type and included in a first type log unit from among a plurality of log units, which are configured to store the program data in the log block having a corresponding log type, into a second type log block formed by a second log type or converts a log block included in a second type log unit from among the plurality of log units into the first type log block, the first log type being different from the second log type,
   wherein the first type log block is formed randomly to logic addresses in which the program data is programmed, and a second type log block is formed sequentially to logic addresses in which the program data is programmed,
   wherein the determining the log type with respect to mapping to the log block comprises: determining whether the logic addresses of program data correspond to logic addresses of pages stored in second type log blocks of a second type log unit; and determining whether the logic addresses of program data are sequential to the logic addresses of pages stored in the second type log blocks if the logic addresses of program data correspond to the logic addresses of pages stored in the second type log blocks, and the address mapping method further comprising:

determining whether a size of a storage space of a corresponding log block is less than a threshold value if the logic addresses of program data are not sequential to the logic addresses of pages stored in the second type log blocks;

copying the corresponding log block to a data block and determining whether a size of program data is less than n pages, n is a natural number, if the size of the storage space of the corresponding log block is less than the threshold value.

2. The address mapping method of claim 1, further comprising:

converting the second type log block formed sequentially to the logic addresses of the program data as the first type, if the storage space of the corresponding log block is greater than the threshold value.

3. The address mapping method of claim 2, further comprising:

mapping the logic addresses of the program data to the converted first type log block included in the first type log unit.

4. The address mapping method of claim 1, further comprising:

converting the second type log block formed sequentially to the logic addresses of the program data as the first type, if the size of the program data is greater than n pages.

5. The address mapping method of claim 4, further comprising:

mapping the logic addresses of the program data to the converted first type log block included in the first type log unit.

* * * * *